ated under 35
(12) United States Patent  (10) Patent No.: US 8,036,457 B2
Matsushita et al.  (45) Date of Patent: Oct. 11, 2011

(54) IMAGE PROCESSING APPARATUS WITH NOISE REDUCTION CAPABILITIES AND A METHOD FOR REMOVING NOISE FROM A CAPTURED IMAGE

(75) Inventors: Nobuyuki Matsushita, Kanagawa (JP); Kenichi Nishio, Kanagawa (JP)

(73) Assignee: Sony Corporation, Tokyo (JP)

( * ) Notice: Subject to any disclaimer, the term of this patent is extended or adjusted under 35 U.S.C. 154(b) by 1015 days.

(21) Appl. No.: 11/926,298

(22) Filed: Oct. 29, 2007

(65) Prior Publication Data

US 2008/0123950 A1  May 29, 2008

(30) Foreign Application Priority Data

Oct. 30, 2006  (JP) .................................. 2006-294784

(51) Int. Cl.
  *G06K 9/00*  (2006.01)
(52) U.S. Cl. ........................................................ 382/167
(58) Field of Classification Search .................. 382/162, 382/167; 358/518–523
  See application file for complete search history.

(56) References Cited

U.S. PATENT DOCUMENTS

| 7,254,276 B2 * | 8/2007 | Sugimoto et al. ............. 382/250 |
| 2004/0001621 A1 * | 1/2004 | Kusakabe et al. ............. 382/164 |

FOREIGN PATENT DOCUMENTS

| EP | 0833501 | 4/1998 |
| EP | 1289309 | 3/2003 |
| EP | 1694077 | 8/2006 |
| JP | 2004-040235 | 2/2004 |
| JP | 2004-151907 | 5/2004 |
| JP | 2005-026962 | 1/2005 |
| JP | 2005-130297 | 5/2005 |
| JP | 2005-318387 | 11/2005 |
| JP | 2006-041687 | 2/2006 |

OTHER PUBLICATIONS

An office action from the Japanese Patent Office for Japanese Patent document No. 2005-130297 issued Sep. 30, 2008.
Japanese Office Action issued on May 19, 2009 in connection with JP Application No. 2006-294784.
European Search Report corresponding to European Serial No. 07254206.1, Sep. 2010.

* cited by examiner

*Primary Examiner* — Yubin Hung
(74) *Attorney, Agent, or Firm* — SNR Denton US LLP (57) ABSTRACT

An image processing apparatus to perform a denoising process of removing noise included in image data based on a predetermined parameter is provided. The image processing apparatus includes an input unit configured to input image data; a physical characteristic value calculating unit configured to calculate a brightness-dependent physical characteristic value based on brightness of the input image data; a color determining unit configured to determine a color of the input image data; and a parameter deciding unit configured to decide the parameter based on the physical characteristic value calculated by the physical characteristic value calculating unit and a visual characteristic value according to the color determined by the color determining unit.

9 Claims, 6 Drawing Sheets

| COLOR | (r, g, b) | CORRECTION VALUE: k |
|---|---|---|
| GREEN | (100, 170, 100) | 2.0 |
| YELLOW | (240, 200, 60) | 2.0 |
| BLUE | (90, 90, 200) | 3.0 |
| RED | (200, 50, 70) | 3.0 |
| FLESH COLOR | (220, 170, 170) | 3.0 |
| OTHER |  | 2.5 |

IMAGE PROCESSING APPARATUS WITH NOISE REDUCTION CAPABILITIES AND A METHOD FOR REMOVING NOISE FROM A CAPTURED IMAGE

CROSS REFERENCES TO RELATED APPLICATIONS

The present invention contains subject matter related to Japanese Patent Application JP 2006-294784 filed in the Japanese Patent Office on Oct. 30, 2006, the entire contents of which are incorporated herein by reference.

BACKGROUND OF THE INVENTION

1. Field of the Invention

The present invention relates to an image processing apparatus, and particularly to an image processing apparatus capable of effectively removing noise included in image signals, an image capturing apparatus, an image processing method in these apparatuses, and a program allowing a computer to execute the method.

2. Description of the Related Art

RAW data output from an imaging device, such as a CCD (charge coupled device), includes various types of noise. As a method for effectively removing the noise, a method for changing a level of denoising in consideration for a visual characteristic of humans has been widely known.

For example, there has been suggested an image processing method for determining colors of an image on which noise is superimposed in units of areas of a predetermined size, deciding a parameter in accordance with the determined colors, and performing a denoising process in accordance with the decided parameter (e.g., see Patent Document 1: Japanese Unexamined Patent Application Publication No. 2004-40235 (FIG. 1)).

SUMMARY OF THE INVENTION

In the above-described related art, the parameter for a denoising process is changed in accordance with the colors in the respective areas of a predetermined size of the image, and thus the level of denoising can be changed in units of colors.

Shot noise depends on brightness (level), and the amount of noise increases as the amount of signals becomes larger. Thus, if the noise included in RAW data is shot noise, the level of denoising is changed in accordance with the amount of signals independently of colors of the image.

However, in the above-described related art, it may be impossible to effectively remove noise in which the level of denoising is changed independently of the colors of the image, such as shot noise, although denoising based on the colors of the image can be performed.

The present invention is directed to effectively removing noise in consideration for a visual characteristic of humans and properties of noise included in image signals.

According to an embodiment of the present invention, there is provided an image processing apparatus to perform a denoising process of removing noise included in image data based on a predetermined parameter. The image processing apparatus includes input means for inputting image data; physical characteristic value calculating means for calculating a brightness-dependent physical characteristic value based on brightness of the input image data; color determining means for determining a color of the input image data; and parameter deciding means for deciding the parameter based on the physical characteristic value calculated by the physical characteristic value calculating means and a visual characteristic value according to the color determined by the color determining means. Also, there are provided an image capturing apparatus, an image processing method in those apparatuses, and a program allowing a computer to execute the method. With this configuration, a parameter can be decided based on a physical characteristic value depending on brightness of input image data and a visual characteristic value according to a color of the input image data, and noise included in the input image data can be appropriately removed based on the decided parameter.

The physical characteristic value calculating means can calculate the physical characteristic value based on brightness of a target pixel, which is a piece of the input image data. Accordingly, noise in the target pixel included in the input image data can be appropriately removed based on the decided parameter.

The color determining means can calculate the visual characteristic value based on a color of image data including the target pixel and a plurality of surrounding pixels positioned around the target pixel. Accordingly, noise in the target pixel and the plurality of surrounding pixels around the target pixel included in the input image data can be appropriately removed based on the decided parameter.

In the denoising process, noise included in the input image data can be removed based on image data including the target pixel and a plurality of surrounding pixels positioned around the target pixel. Accordingly, noise in the target pixel and the plurality of surrounding pixels around the target pixel included in the input image data can be appropriately removed based on the decided parameter.

The visual characteristic value is a correction value, which is a coefficient to correct the physical characteristic value calculated by the physical characteristic value calculating means, and the color determining means can calculate the correction value based on the color of the input image data. Accordingly, the parameter can be decided by correcting the physical characteristic value depending on brightness of the input image data in accordance with the correction value according to the color of the input image data, and noise included in the input image data can be appropriately removed based on the decided parameter.

The parameter deciding means can calculate the parameter by multiplying the physical characteristic value calculated by the physical characteristic value calculating means by the visual characteristic value according to the color determined by the color determining means. Accordingly, a proper parameter can be decided by using the physical characteristic value depending on brightness of the input image data and the visual characteristic value according to the color of the input image data.

The image data input by the input means can be image data of a Bayer array. Accordingly, a denoising process of appropriately removing noise can be performed on the image data of the Bayer array.

The image data input by the input means can be RAW data output from an imaging device. Accordingly, noise can be appropriately removed from the RAW data output from the imaging device.

According to another embodiment of the present invention, there is provided an image processing apparatus to perform a denoising process of removing noise included in image data based on a physical characteristic of the noise and a visual characteristic of humans. Accordingly, noise included in the image data can be appropriately removed based on the physical characteristic of the noise included in the image data and the visual characteristic of humans about the image data.

A value indicating the physical characteristic of the noise is a physical characteristic value calculated based on brightness of the image data. A value indicating the visual characteristic of humans is a visual characteristic value calculated based on a color of the image data. In the denoising process, noise included in the image data can be removed by using a parameter calculated based on the physical characteristic value and the visual characteristic value. Accordingly, the parameter can be calculated based on the physical characteristic value depending on brightness of the image data and the visual characteristic value according to the color of the imaged data, and noise included in the image data can be appropriately removed based on the calculated parameter.

According to the above-described configuration, an advantage of effectively removing noise in consideration for a physical characteristic of noise and a visual characteristic of humans can be obtained.

DESCRIPTION OF THE PREFERRED EMBODIMENTS

Hereinafter, an embodiment of the present invention is described in detail with reference to the drawings.

In the embodiment of the present invention, a "denoising process" means image processing of reducing or removing noise performed on image data including noise. That is, "denoising" includes not only completely removing noise from image data including noise, but also reducing the noise.

Figure 1:
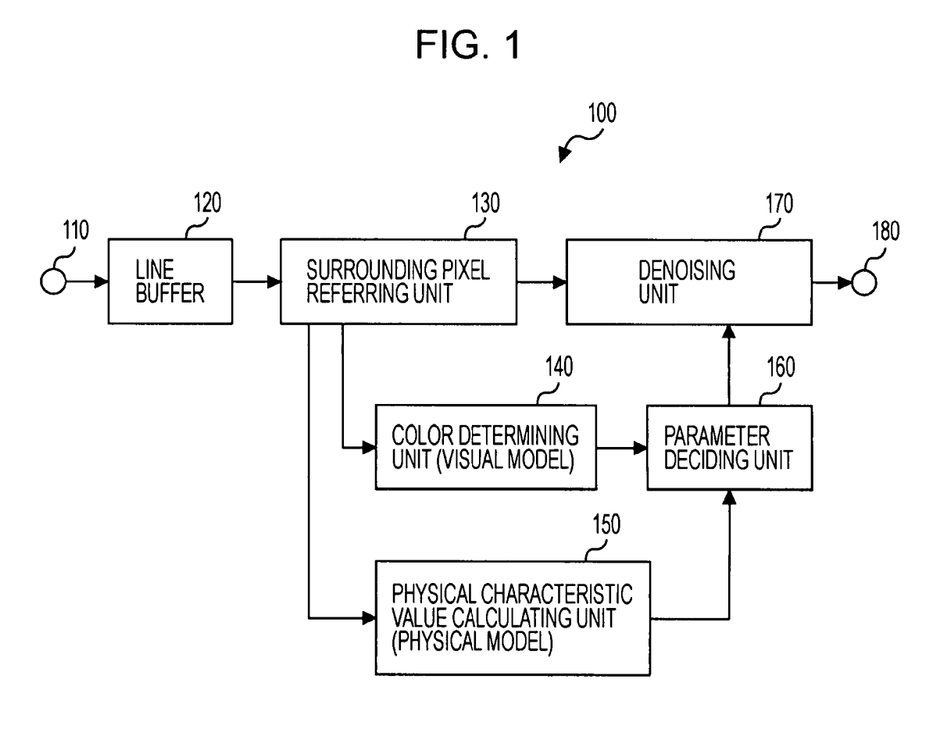
FIG. 1 is a block diagram showing an example of a functional configuration of an image processing apparatus 100 according to an embodiment of the present invention.

FIG. 1 is a block diagram showing an example of a functional configuration of an image processing apparatus 100 according to the embodiment of the present invention.

The image processing apparatus 100 includes an input terminal 110, a line buffer 120, a surrounding pixel referring unit 130, a color determining unit 140, a physical characteristic value calculating unit 150, a parameter deciding unit 160, a denoising unit 170, and an output terminal 180.

The input terminal 110 receives color signal data (image data of a Bayer array) composed of color signals of RGB, and transmits the input image data to the line buffer 120. Examples of image data of a Bayer array include RAW data output from an imaging device, such as a CCD (charge coupled device). The RAW data is an example of image data corresponding to an image captured by an imaging device to capture an image of a predetermined subject.

Figure 2A:
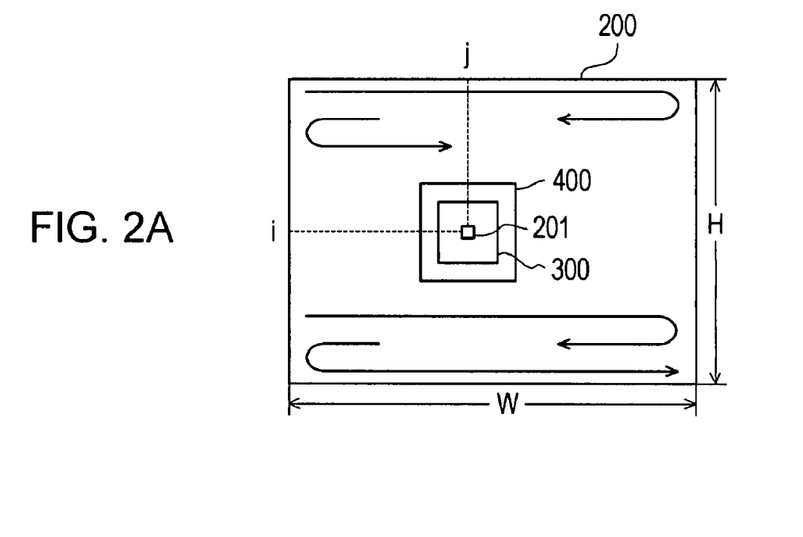
FIGS. 2A, 2B, and 2C conceptually show image data 200 input through an input terminal 110 and stored in a line buffer 120, and image data 300 and 400 of a Bayer array read from the image data 200.
Figure 2B:
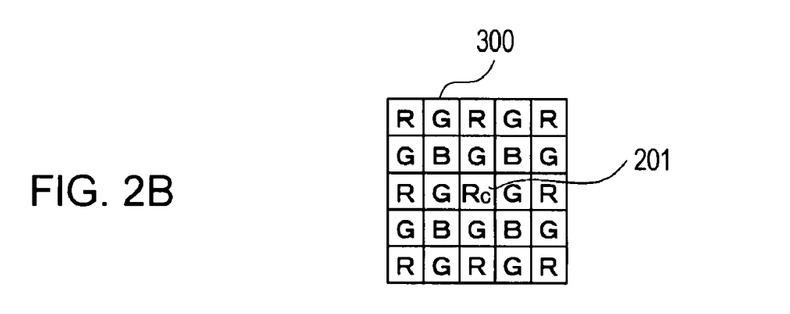
Figure 2C:
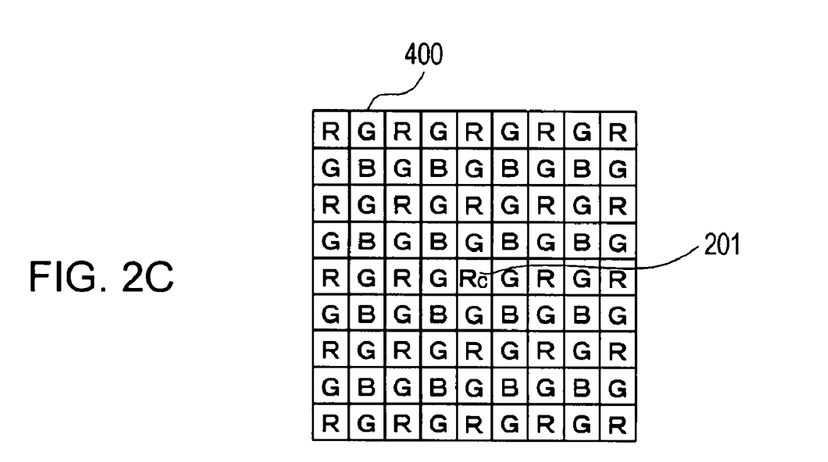

The Bayer array is an array of pixels shown in FIGS. 2B and 2C. That is, in the array of pixels, basic blocks are periodically placed. Each basic block includes two pixels in the horizontal direction×two pixels in the vertical direction. In the basic block, two green pixels (G) are placed on one of diagonals, and a red pixel (R) and a blue pixel (B) are placed on the other diagonal.

The line buffer 120 includes line buffers for a plurality of lines, and holds image data of the plurality of lines input through the input terminal 110 in units of lines.

FIG. 2A conceptually shows image data 200 that is input through the input terminal 110 and that is stored in the line buffer 120. The size of the image data 200 shown in FIG. 2A is indicated by W and H, W being the number of horizontal pixels and H being the number of vertical pixels. A variable indicating an address in the vertical direction of each pixel constituting the image data 200 is "i", whereas a variable indicating an address in the horizontal direction is "j".

The surrounding pixel referring unit 130 sequentially reads image data of a predetermined size from the image data of several lines stored in the line buffer 120.

FIGS. 2B and 2C conceptually show image data 300 and image data 400 of the Bayer array, respectively, read from the image data 200 stored in the line buffer 120.

For example, the image data of the predetermined size read by the surrounding pixel referring unit 130 is a target pixel 201 shown in FIG. 2A, the image data 300 (a window of 5×5 pixels) of the Bayer array shown in FIGS. 2A and 2B including the target pixel 201 and a plurality of surrounding pixels, and the image data 400 (a window of 9×9 pixels) of the Bayer array shown in FIGS. 2A and 2C including the target pixel 201 and a plurality of surrounding pixels.

As shown in FIG. 2A, the surrounding pixel referring unit 130 sequentially reads pixels by shifting the target pixel 201 one pixel by one in the direction indicated by arrows, so as to read all pixels of the image data 200.

The physical characteristic value calculating unit 150 calculates a physical characteristic value (the amount of noise), which is a value depending on the brightness of image data, based on the brightness of image data. That is, the physical characteristic value calculating unit 150 refers to the image data of the target pixel 201 read by the surrounding pixel referring unit 130 so as to calculate a physical characteristic value according to the brightness of the image data, and outputs the calculated physical characteristic value to the parameter deciding unit 160.

The color determining unit 140 determines the color of image data and calculates a correction value to correct the physical characteristic value. That is, the color determining unit 140 refers to the image data 300 of the Bayer array read by the surrounding pixel referring unit 130 so as to determine the color of the image corresponding to the image data. Based on the determined color, the color determining unit 140 calculates a correction value, which a coefficient to correct the physical characteristic value of the target pixel 201, and outputs the calculated correction value to the parameter deciding unit 160. This correction value is a visual characteristic value according to the determined color.

The parameter deciding unit 160 calculates a threshold (parameter) used by the denoising unit 170 to perform a denoising process based on the value output from the physical characteristic value calculating unit 150 and the value output from the color determining unit 140, and outputs the calculated threshold to the denoising unit 170.

The denoising unit 170 performs a denoising process by using a denoising method using a ε filter or the like. The denoising unit 170 performs the denoising process on the image data 400 of the Bayer array supplied from the surrounding pixel referring unit 130 in accordance with the threshold output from the parameter deciding unit 160.

The output terminal 180 outputs the image data on which the denoising process has been performed by the denoising unit 170 to the outside.

The color determining unit 140 is further described.

Figure 3:
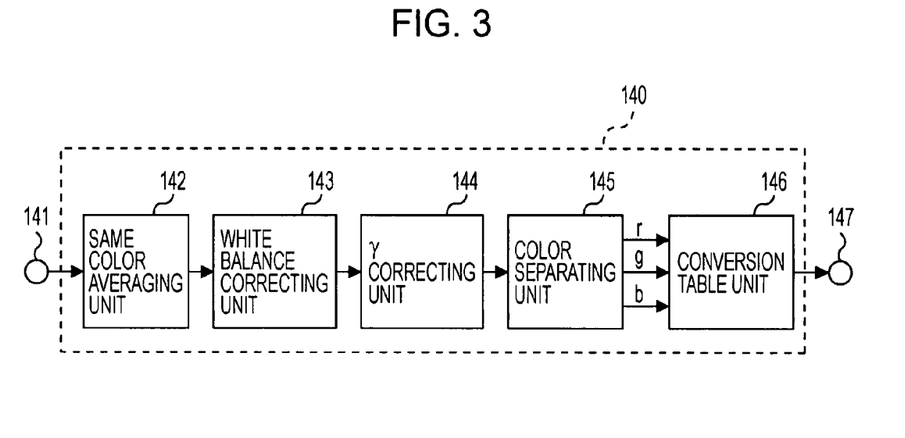
FIG. 3 is a block diagram showing an example of a functional configuration of a color determining unit 140.

FIG. 3 is a block diagram showing an example of a functional configuration of the color determining unit 140.

The color determining unit 140 includes an input terminal 141, a same color averaging unit 142, a white balance correcting unit 143, a γ correcting unit 144, a color separating unit 145, a conversion table unit 146, and an output terminal 147.

Hereinafter, a description is made about a case where the target pixel 201 is R in the image data 300 of the Bayer array having a window size of 5×5 pixels, as shown in FIG. 2B. When the target pixel 201 is R, the image data 300 of the Bayer array having the target pixel 201 at the center includes nine R pixels, twelve G pixels, and four B pixels.

The input terminal 141 receives the image data 300 of the Bayer array read by the surrounding pixel referring unit 130.

The same color averaging unit 142 calculates average values of the respective colors of the pixels about the respective input signals of RGB included in the image data 300 of the Bayer array input through the input terminal 141, and outputs the calculated average values of the respective pixels to the white balance correcting unit 143. Specifically, the same color averaging unit 142 converts the respective input signals R, G, and B to R1, G1, and B1 in accordance with the following expressions 1 to 3, and outputs R1, G1, and B1 to the white balance correcting unit 143.

$R1$=an average value (average density) of pixel values of nine $R$ pixels included in the image data 300 of the Bayer array (expression 1)

$G1$=an average value (average density) of pixel values of twelve $G$ pixels included in the image data 300 of the Bayer array (expression 2)

$B1$=an average value (average density) of pixel values of four $B$ pixels included in the image data 300 of the Bayer array (expression 3)

The white balance correcting unit 143 converts the values R1, G1, and B1 output from the same color averaging unit 142 to R2, G2, and B2 in accordance with the following expressions 4 to 6, and outputs the values R2, G2, and B2 to the γ correcting unit 144.

$R2$=a white balance coefficient of $R1 \times R$ (expression 4)

$G2=G1$ (expression 5)

$B2$=a white balance coefficient of $B1 \times B$ (expression 6)

The γ correcting unit 144 converts the values R2, G2, and B2 output from the white balance correcting unit 143 to R3, G3, and B3 in accordance with the following expressions 7 to 9, and outputs the values R3, G3, and B3 to the color separating unit 145.

$R3=R2 \times \gamma$ coefficient (expression 7)

$G3=G2 \times \gamma$ coefficient (expression 8)

$B3=B2 \times \gamma$ coefficient (expression 9)

The color separating unit 145 separates the colors into r, g, and b based on the respective values R3, G3, and B3 output from the γ correcting unit 144, and outputs the values R3, G3, and B3 to the conversion table unit 146.

Figure 4:
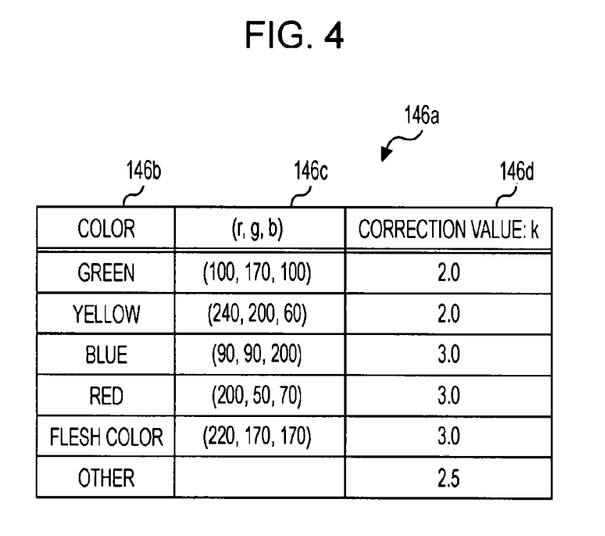
FIG. 4 shows a conversion table 146a of colors and correction values, the table being generated in consideration for a visual characteristic of humans.

FIG. 4 shows a conversion table 146a of colors and correction values, the table being generated in consideration for a visual characteristic of humans.

In the conversion table 146a, colors 146b, values (r, g, b) 146c, and correction values 146d are mutually associated. This table is used to convert the values R3, G3, and B3 output from the color separating unit 145 to a correction value k.

The conversion table unit 146 selects the values that are the most approximate to R3, G3, and B3 output from the color separating unit 145 from among the values (r, g, b) 146c, with reference to the conversion table 146a. Then, the conversion table unit 146 selects a correction value k corresponding to the selected values (r, g, b) and outputs the selected correction value k to the outside via the output terminal 147. At the selection of the values that are the most approximate to R3, G3, and B3 from among the values (r, g, b) 146c, a color space distance (vector) of each value is used as reference.

Hereinafter, the method for calculating a physical characteristic value in the physical characteristic value calculating unit 150 is further described.

First, a physical characteristic of noise is described.

Figure 5A:
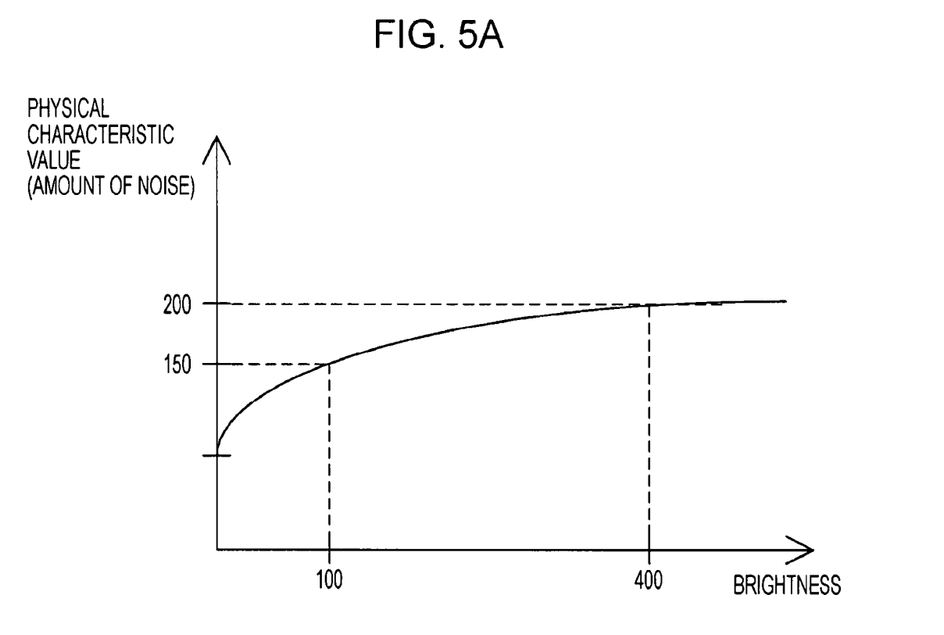
FIG. 5A is a graph showing an example of the relationship between brightness and a physical characteristic value (the amount of noise) of an image.

FIG. 5A is a graph showing an example of the relationship between brightness and a physical characteristic value (the amount of noise) of an image.

Typically, the level of noise (standard deviation of signals) in output of an imaging device, such as a CCD, can be expressed by a square root of a sum of energies of floor noise, optical shot noise, and uneven sensitivity noise. Specifically, the level of noise is expressed by the following expression 10.

$$\sigma(x) = \sqrt{(ax^2 + bx + c)} \quad \text{(expression 10)}$$

In this expression, "x" is the amount of signals, "a" is a constant related to uneven sensitivity noise, "b" is a constant related to optical shot noise, "c" is a constant related to floor noise mainly including dark-current shot noise and thermal noise of a circuit, and "σ(x)" is a physical characteristic value. However, in applications dealing with various types of noise, some terms in the square root in expression 10 may be omitted depending on the purpose.

As an approximate expression of expression 10, expression 11 is established by omitting an effect of uneven sensitivity noise.

$$\sigma(x) = \sqrt{(bx + c)} \quad \text{(expression 11)}$$

Furthermore, expression 12 is established as an approximate expression of expression 11.

$$\sigma(x) = b(\sqrt{x}) + c \quad \text{(expression 12)}$$

The above-described "a", "b", and "c" are parameters that can be determined in accordance with a CCD, a substrate, temperature, and so on. Measured values or values calculated based on theoretical values may be used as the parameters.

In this embodiment, the physical characteristic value σ(x) is calculated based on the amount of signals x of the target pixel 201 by using expression 12. In this case, the amount of signals x and the physical characteristic value σ(x) form a curve (noise curve) of the graph shown in FIG. 5A.

The physical characteristic value calculating unit 150 refers to the image data of the target pixel 201 read by the surrounding pixel referring unit 130, calculates the physical characteristic value σ(x) according to the amount of signals x of the image corresponding to the image data in accordance with expression 12, and a outputs the calculated physical characteristic value σ(x) to the parameter deciding unit 160.

FIG. 5A shows an example of a noise curve in a case where the constant "b" related to optical shot noise is 5 and the constant "c" related to floor noise is 100, as in the following expression.

$$\sigma(x)=5(\sqrt{x})+100 \text{ (the amount of signals x: 0 to 800)}$$

In this case, it is assumed that the physical characteristic value σ(x) is 150 when the amount of signals x is 100 and that the physical characteristic value σ(x) is 200 when the amount of signals x is 400.

Next, a method for deciding a threshold for a denoising process using a ε filter is described.

Figure 5B:
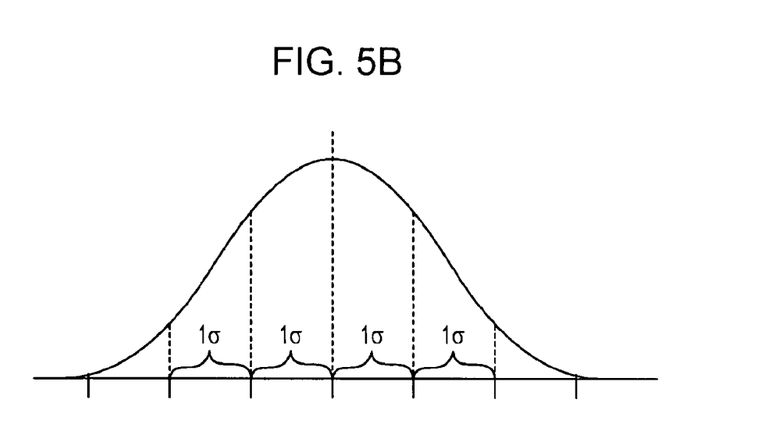
FIG. 5B is a graph showing the relationship between a normal distribution table (Gauss function) and a physical characteristic value σ(x) in a case where it is assumed that the amount of noise is normally distributed.

FIG. 5B shows the relationship between a normal distribution table (Gauss function) and the physical characteristic value σ(x) in a case where it is assumed that the amount of noise is normally distributed.

As shown in FIG. 5B, when it is assumed that the amount of noise is normally distributed, the following relationship is established between noise and the threshold, because the physical characteristic value σ(x) is standard deviation with respect to the amount of signals x.

When the threshold is 1σ, 68% of noise is included in the range (±1σ) of the threshold. When the threshold is 2σ, 96% of noise is included in the range (±2σ) of the threshold. When the threshold is 3σ, 99% of noise is included in the range (±3σ) of the threshold.

Since such a relationship is established between noise and the threshold, a large amount of noise can be removed when the threshold is set to high in a denoising process performed on an image including noise. However, when the threshold is set to high, a large amount of noise is removed and thus a proportion of a stored edge component of the image decreases. Therefore, when the denoising process is performed, an appropriate threshold should be set in consideration for a noise component and an edge component.

Specifically, when the denoising process is performed by setting the threshold to 1σ, 32% of noise is not removed and remains in the image, but a relatively large proportion of edge component of the image can be stored.

When the denoising process is performed by setting the threshold to 2σ, 4% of noise remains, and noise can be reduced by 28% compared to the case where the threshold is set to 1σ. In this case, however, the proportion of edge component of the image that can be stored reduces compared to the case where the threshold is set to 1σ.

Setting of the threshold is important also in a denoising method using a bilateral filter or wavelet transformation, as well as the ε filter.

The parameter deciding unit 160 calculates a threshold kσ(x) by multiplying the correction value k output from the color determining unit 140 by the physical characteristic value σ(x) output from the physical characteristic value calculating unit 150, and outputs the calculated threshold kσ(x) to the denoising unit 170. In this way, by deciding the threshold kσ(x), a denoising process can be performed by using an appropriate threshold in consideration for the physical characteristic of noise and the visual characteristic of humans.

Now, the denoising method in the denoising unit 170 is described in detail. In this embodiment, a denoising method using a ε filter of 9×9 pixels is described as an example.

In the denoising method using a ε filter, averaging is performed on surrounding pixels that are determined to be "fellow pixels" among surrounding pixels in a window having a target pixel at the center. Whether a surrounding pixel is a "fellow pixel" is determined based on whether the absolute value of the difference between the target pixel and the surrounding pixel is in the range of a threshold. If the absolute value of the difference between the target pixel and the surrounding pixel is in the range of the threshold, the surrounding pixel is determined to be a fellow pixel and is regarded as a target of averaging. On the other hand, if the absolute value of the difference between the target pixel and the surrounding pixel is out of the range of the threshold, the surrounding pixel is regarded to be noise and is not regarded as a target of averaging. In this way, in the denoising method using a ε filter, a pixel having a value significantly different from that of the target pixel is determined to be noise and is removed.

Figure 6:
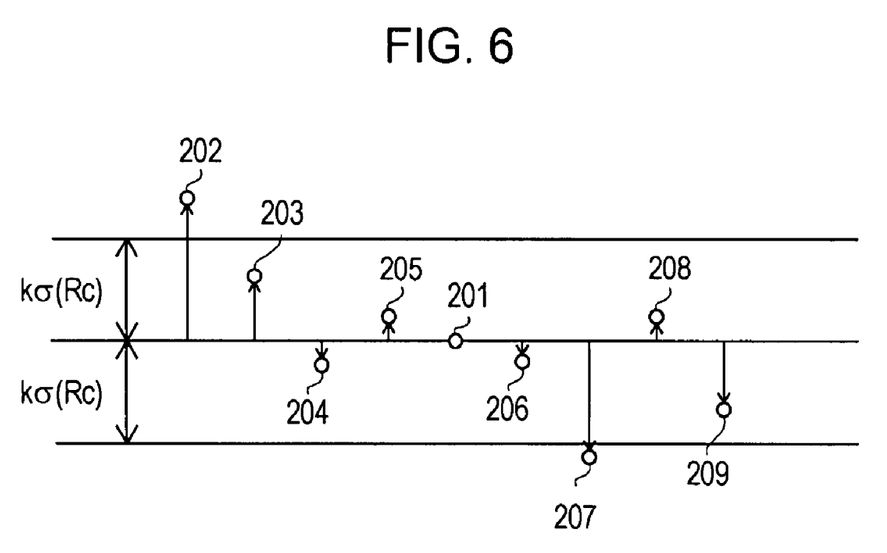
FIG. 6 shows the relationship in pixel level between a target pixel 201 and surrounding pixels 202 to 209.

FIG. 6 shows the relationship in pixel level between the target pixel 201 and surrounding pixels 202 to 209.

For example, when there are eight surrounding pixels 202 to 209 around the target pixel 201, as shown in FIG. 6, the surrounding pixels 203 to 206 and 208-209 existing within the range of a threshold kσ(Rc) with the target pixel 201 (Rc) at the center are determined to be fellow pixels and are regarded as targets of averaging. On the other hand, the surrounding pixels 202 and 207 outside the range of the threshold kσ(Rc) are determined to be noise and are not regarded as targets of averaging.

Here, a description is made about a case where the target pixel 201 is R in the image data 400 of the Bayer array having a window size of 9×9 pixels, as shown in FIG. 2C. When the target pixel 201 is R, the image data 400 of the Bayer array having the target pixel 201 at the center includes twenty-five R pixels including the target pixel 201. In FIG. 2C, the target pixel 201 is represented by Rc.

The denoising unit 170 performs a denoising process on the image data 400 of the Bayer array supplied from the surrounding pixel referring unit 130 in accordance with the threshold kσ(Rc) output from the parameter deciding unit 160. Specifically, among the twenty-five R pixels included in the image data 400 of the Bayer array, the surrounding pixels R existing within the range of the threshold kσ(Rc) with the target pixel 201 (Rc) at the center are determined to be fellow pixels and are regarded as targets of averaging. On the other hand, the surrounding pixels R outside the range of the threshold kσ(Rc) are determined to be noise and are not regarded as targets of averaging. In this way, the denoising process is performed.

Next, an operation of the image processing apparatus 100 according to the embodiment of the present invention is described with reference to the drawings.

Figure 7:
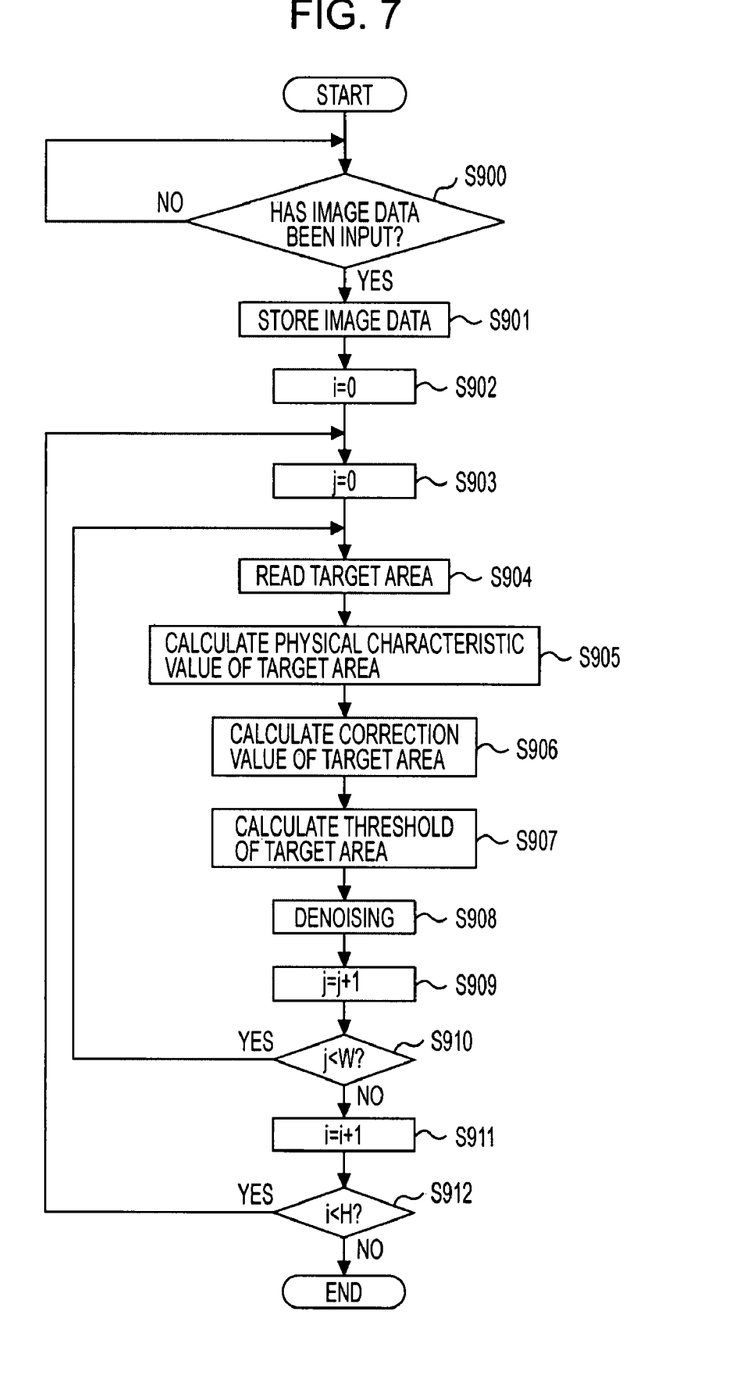
FIG. 7 is a flowchart showing a procedure of a denoising process performed by the image processing apparatus 100.

FIG. 7 is a flowchart showing a procedure of a denoising process performed by the image processing apparatus 100.

Upon input of image data through the input terminal 110 (step S900), the input image data is stored in the line buffer 120 (step S901).

Then, a variable i indicating the address in the vertical direction of each pixel constituting the image data 200 stored in the line buffer 120 is initialized to 0 (step S902) and a variable j indicating the address in the horizontal direction is initialized to 0 (step S903).

Then, the surrounding pixel referring unit 130 reads the image data 400 of the Bayer array including the target pixel 201 at the position (i, j) and a plurality of surrounding pixels from the line buffer 120 (step S904).

Then, the physical characteristic value calculating unit 150 refers to the image data of the target pixel 201 read by the surrounding pixel referring unit 130, calculates a physical characteristic value σ(x) of the target pixel 201 based on the amount of signals x of the target pixel 201, and outputs the calculated physical characteristic value σ(x) to the parameter deciding unit 160 (step S905).

Then, the color determining unit 140 refers to the image data 300 of the Bayer array read by the surrounding pixel referring unit 130, determines the color of the image data 300 of the Bayer array, calculates a correction value k based on the determined color, and outputs the calculated correction value k to the parameter deciding unit 160 (step S906).

Then, the parameter deciding unit 160 calculates a threshold kσ(x) by multiplying the correction value k output from the color determining unit 140 by the physical characteristic value σ(x) output from the physical characteristic value calculating unit 150, and outputs the calculated threshold kσ(x) to the denoising unit 170 (step S907).

Then, the denoising unit 170 performs a denoising process on the image data 400 of the Bayer array supplied from the surrounding pixel referring unit 130 in accordance with the threshold kσ(x) output from the parameter deciding unit 160 (step S908).

Then, the address j in the horizontal direction is incremented by one (step S909), so that the position of the target pixel 201 shifts by one pixel. Then, it is determined whether the address j is smaller than the number of horizontal pixels W (step S910). If j<W is satisfied (step S910), steps S904 to S909 are repeated.

On the other hand, if j≧W is satisfied (step S910), the address i in the vertical direction is incremented by one (step S911), so that the position of the target pixel 201 shifts by one pixel in the vertical direction. Then, it is determined whether the address i is smaller than the number of vertical pixels H (step S912). If i<H is satisfied (step S912), steps S903 to S911 are repeated.

If i≧H (step S912) is satisfied, the denoising process ends.

In the above-described embodiment, a case where the target pixel 201 is R is described. The process is performed in the same manner in a case where the target pixel 201 is G or B, and thus the corresponding description is omitted.

Next, a visual characteristic of humans is briefly described.

According to a visual characteristic for typical colors, most humans are sensitive to yellow light and green light. For this reason, they feel that resolution decreases if a denoising level is high for yellow and green.

On the other hand, most humans are insensitive to red light and blue light. For this reason, they do not feel that resolution decreases even if a denoising level is high for red and blue.

Also, according to a visual characteristic for colors of a subject, humans are sensitive to change in color of a face. For this reason, a denoising level is set to high for flesh color so as to generate a beautiful flesh color in many cases.

Furthermore, humans are sensitive to change in color of the sky. For this reason, a denoising level is set to high for sky color so as to generate a beautiful sky color in many cases.

For example, in a case where parameters for a denoising process are determined based on only colors of an image, if a threshold of green is set to low and if a threshold of red is set to high, the level of denoising can be changed in accordance with the set colors. However, properties of noise superimposed on image signals are independent of a visual characteristic of humans. Therefore, it may be impossible to perform appropriate denoising for dark red and light green if the physical characteristic of the noise is not considered.

Accordingly, in this embodiment, the physical characteristic of noise is considered by calculating a physical characteristic value, which depends on brightness, and the visual characteristic of humans is also considered by correcting the physical characteristic value in accordance with colors of an image. With this method, according to this embodiment, noise can be effectively removed by considering the physical characteristic of noise and the visual characteristic of humans.

Also, according to this embodiment, a denoising process is performed by deciding parameters of the denoising process in consideration for both the visual characteristic of humans and the physical characteristic of noise. Accordingly, a visually natural image can be obtained.

Furthermore, according to this embodiment, the constant "a" related to uneven sensitivity noise, the constant "b" related to optical shot noise, and the constant "c" related to floor noise are parameters that can be decided in accordance with a CCD, a substrate, temperature, and so on. Since the physical characteristic value of noise is calculated in consideration for these constants, an effect of denoising can be applied between different systems.

Also, according to this embodiment, if it is assumed that noise is normally distributed, it can be calculated in advance how much of the noise can be removed based on the decided threshold.

In this embodiment, when the physical characteristic value calculating unit 150 calculates the physical characteristic value σ(x), the value of the amount of signals of the target pixel is used as is. Alternatively, the physical characteristic value σ(x) may be calculated by using the value after the denoising process using an LPF, a ε filter, or a median filter, as the amount of signals x.

Alternatively, the physical characteristic value σ(x) may be calculated based on image data in which the white balance has been adjusted, in consideration for an effect of a white balance coefficient.

Furthermore, shot noise at shooting may be obtained by measuring standard deviation in an OB (optical black) area of the screen, so that the shot noise corresponds to change in noise due to an increase in temperature.

In this embodiment, when the color determining unit 140 calculates the correction value k, a value obtained by interpolating the correction value k corresponding to approximate r, g, and b values in accordance with a color space distance of the r, g, and b values may be used. For example, the correction value k can be calculated based on a ratio of distance in the color space distance of the r, g, and b values.

When the color determining unit 140 calculates the correction value k, image data composed of colors of R, G, and B is used. Alternatively, image data composed of complementary colors of C, M, and Y may also be used.

When the color determining unit 140 calculates the correction value k, a white balance value may be fixed and simplified.

When the color determining unit 140 calculates the correction value k, average values of the respective colors in a window are used. Alternatively, a median value, an LPF value, or a ε filter value may also be used.

When the color determining unit 140 calculates the correction value k, the correction value k for a dark color, such as brown, may be set to large in consideration for that the noise in a dark portion is emphasized by a γ curve.

Since the γ correcting unit 144 is for considering an effect of a γ curve, color determination may be performed based on a color space in which γ reverse correction is performed, so that the γ correcting unit 144 can be omitted.

In the above-described embodiment, the threshold kσ(x) is calculated by multiplying the correction value k by the physical characteristic value σ(x). If an appropriate threshold can be decided in consideration for the physical characteristic of noise and the visual characteristic of humans, the threshold may be calculated through another calculation, such as addition of the correction value k and the physical characteristic value σ(x).

When the denoising unit 170 performs averaging by using a ε filter, the respective pixels on which the averaging is performed may be weighted. For example, a weight can be changed in accordance with the distance between a target pixel and each pixel.

In the above-described embodiment, the denoising method using a ε filter has been described. Alternatively, the denoising process may be performed by using wavelet transformation, a bilateral filter, or a trilateral filter, instead of the ε filter, by using a predetermined parameter.

This embodiment may be applied as a threshold deciding method of coring by using wavelet transformation as the denoising method.

Furthermore, this embodiment may be applied to the denoising process performed after band division. Also, the denoising process may be performed by setting a threshold that varies depending on the band.

Now, a bilateral filter is described as an example of a filter other than the ε filter.

The bilateral filter is a filter to perform weighting in accordance with a level difference. Hereinafter, an example using a Gauss function as a weighting function is described.

The Gauss function can be represented as $N(\mu, \sigma^2)$ (N(mean, variance)).

When the following expressions:

$$\text{noise}(x) = b(\sqrt{x}) + c; \text{ and}$$

$$\text{thresh}(x) = k(x) \times \text{noise}(x)$$

are satisfied, the bilateral filter uses a Gauss function of $N(0, (\text{thresh}(x))^2)$.

That is, the bilateral filter uses a diffused Gauss function when the physical characteristic value (the amount of noise) is large, and uses a further diffused Gauss function when the color correction value is large.

In the above-described embodiment, the Bayer array is adopted as a pixel array. Alternatively, a pixel array other than the Bayer array may be applied.

In the above-described embodiment, the window size of the image data 300 is 5×5 and the window size of the image data 400 is 9×9. Another window size may also be used, and the target area may be variable.

Furthermore, the window size of the pixel array used by the color determining unit 140 may be the same as the window size used by the denoising unit 170.

In the above-described embodiment, the image processing apparatus is described. This embodiment can also be applied to an image capturing apparatus such as a digital camera or an image processing apparatus such as a personal computer having this configuration.

The embodiment of the present invention is an example to embody the present invention and has correspondence with specific elements in the claims as described below. However, the present invention is not limited to the above-described embodiment, but various modifications may occur without deviating from the scope of the present invention.

That is, the image processing apparatus corresponds to the image processing apparatus 100.

The input means corresponds to the input terminal 110. The physical characteristic value calculating means corresponds to the physical characteristic value calculating unit 150. The color determining means corresponds to the color determining unit 140. The parameter deciding means corresponds to the parameter deciding unit 160. The denoising process is performed by the denoising unit 170.

The image processing apparatus to perform a denoising process of removing noise included in image data based on a physical characteristic of noise and a visual characteristic of humans corresponds to the image processing apparatus 100.

The image capturing apparatus corresponds to the image processing apparatus 100.

The inputting corresponds to step S900. The calculating a physical characteristic value corresponds to step S905. The determining a color corresponds to step S906. The deciding the parameter corresponds to step S907.

The procedure of the process described in the embodiment of the present invention may be regarded as a method having the series of steps, or may be regarded as a program allowing a computer to execute the series of steps and a recording medium to store the program.

What is claimed is:

1. An image processing apparatus that performs a process of removing noise in image data based on a predetermined parameter, the image processing apparatus comprising:
   an input unit by means of which image data is input into the image processing apparatus;
   a physical characteristic value calculating unit that calculates a brightness-dependent physical characteristic value based on brightness of the input image data;
   a color determining unit that determines a color of the input image data based on a human visual characteristic; and
   a parameter deciding unit that determines the predetermined parameter based on the physical characteristic value calculated by the physical characteristic value calculating unit and a visual characteristic value according to the color determined by the color determining unit,
   wherein,
   the parameter deciding unit calculates the predetermined parameter by multiplying the physical characteristic value calculated by the physical characteristic value calculating unit by the visual characteristic value according to the color determined by the color determining unit.

2. The image processing apparatus according to claim 1, wherein the physical characteristic value calculating unit calculates the physical characteristic value based on brightness of a target pixel, which is a piece of the input image data.

3. The image processing apparatus according to claim 2, wherein the color determining unit calculates the visual characteristic value based on a color of image data including the target pixel and a plurality of surrounding pixels positioned around the target pixel.

4. The image processing apparatus according to claim 2, wherein, noise included in the input image data is removed based on image data including the target pixel and a plurality of surrounding pixels positioned around the target pixel.

5. The image processing apparatus according to claim 1, wherein:
   the visual characteristic value is a correction value, which is a coefficient to correct the physical characteristic value calculated by the physical characteristic value calculating unit, and
   the color determining unit calculates the correction value based on the color of the input image data.

6. The image processing apparatus according to claim 1, wherein the image data input by the input unit is image data of a Bayer array.

7. The image processing apparatus according to claim 1, wherein the image data input by the input unit is RAW data output from an imaging device.

8. An image processing method for performing a denoising process of removing noise included in image data based on a predetermined parameter, the image processing method comprising:
    inputting image data into an image processing apparatus;
    calculating a brightness-dependent physical characteristic value based on brightness of the input image data in the image processing apparatus ;
    determining a color of the input image data based on a human visual characteristic in the image processing apparatus ; and
    deciding the predetermined parameter based on the calculated physical characteristic value and a visual characteristic value obtained according to the determined color,
wherein,
    the predetermined parameter is decided by multiplying the physical characteristic value by the visual characteristic value.

9. A non-transitory computer-readable medium storing a program which when executed by a processor performing the steps of:
    inputting image data into the computer;
    calculating a brightness-dependent physical characteristic value based on brightness of the input image data;
    determining a color of the input image data based on a human visual characteristic;
    deciding a predetermined parameter by multiplying the calculated physical characteristic value by a visual characteristic value obtained according to the determined color; and
    performing a denoising process of removing noise included in image data based on the predetermined parameter.

\* \* \* \* \*